(12) United States Patent
Kim et al.

(10) Patent No.: US 10,222,638 B2
(45) Date of Patent: Mar. 5, 2019

(54) CURVED DISPLAY MANUFACTURING DEVICE AND CURVED DISPLAY MANUFACTURING METHOD

(71) Applicant: TOVIS CO., LTD., Incheon (KR)

(72) Inventors: Hwan Jin Kim, Incheon (KR); Chang Min Oh, Incheon (KR); Gi Yun Eom, Incheon (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 15/506,253

(22) PCT Filed: Nov. 10, 2014

(86) PCT No.: PCT/KR2014/010724
§ 371 (c)(1),
(2) Date: Feb. 24, 2017

(87) PCT Pub. No.: WO2016/035930
PCT Pub. Date: Mar. 10, 2016

(65) Prior Publication Data
US 2017/0255033 A1 Sep. 7, 2017

(30) Foreign Application Priority Data
Sep. 2, 2014 (KR) .......................... 10-2014-0116329

(51) Int. Cl.
*H05K 13/00* (2006.01)
*G02F 1/13* (2006.01)
(Continued)

(52) U.S. Cl.
CPC ...... *G02F 1/1303* (2013.01); *G02F 1/133305* (2013.01); *G09F 9/00* (2013.01);
(Continued)

(58) Field of Classification Search
CPC ............ G02F 1/1303; G02F 1/133305; G02F 2001/133354
(Continued)

(56) References Cited

U.S. PATENT DOCUMENTS 6,459,462 B1 * 10/2002 Seraphim ............ G02F 1/13336
156/298
7,462,321 B2 * 12/2008 Udin ...................... B29C 33/307
264/316
(Continued)

FOREIGN PATENT DOCUMENTS

JP 05-193100 A 8/1993
JP 2002-014359 A 1/2002
(Continued)

OTHER PUBLICATIONS

International Search Report for PCT/KR2014/010724 dated May 15, 2015 from Korean Intellectual Property Office.

*Primary Examiner* — Christopher Raabe
(74) *Attorney, Agent, or Firm* — Revolution IP, PLLC (57) ABSTRACT

Disclosed are a curved display manufacturing apparatus, comprising: a curved surface suction mold comprising a panel seat surface having a curved shape corresponding to a curved shape of the curved display to be formed, and air sucking holes formed through the panel seat surface; an air sucking unit for sucking air through the air sucking holes; a main frame for supporting the curved surface suction mold, to space the curved surface suction mold from a bottom of the main frame; and a pressing roller unit for pressing a curvature maintaining member to maintain the display panel in a bent state while sliding along a curved surface of the display panel under a condition that the curvature maintaining member overlaps with the display panel, for pressed attachment of the curvature maintaining member to the display panel.

12 Claims, 7 Drawing Sheets

(51) Int. Cl.
*G09F 9/00* (2006.01)
*G02F 1/1333* (2006.01)
*G09F 9/30* (2006.01)
*G09F 9/35* (2006.01)
*G02F 1/1335* (2006.01)

(52) U.S. Cl.
CPC ............... *G09F 9/301* (2013.01); *G09F 9/35* (2013.01); *G02F 1/133528* (2013.01); *G02F 2001/133354* (2013.01)

(58) Field of Classification Search
USPC ...................................... 445/24, 66
See application file for complete search history.

(56) References Cited

U.S. PATENT DOCUMENTS

| | | | | |
|---|---|---|---|---|
| 2010/0103138 | A1* | 4/2010 | Huang | G06F 3/044 345/174 |
| 2010/0147030 | A1* | 6/2010 | Rietbergen | C03B 23/0252 65/106 |
| 2011/0068492 | A1* | 3/2011 | Chen | G02F 1/1303 264/1.7 |
| 2012/0044618 | A1* | 2/2012 | Lee | 361/679.01 |
| 2012/0168058 | A1 | 7/2012 | Kim et al. | |
| 2012/0320509 | A1 | 12/2012 | Kim et al. | |
| 2014/0002973 | A1* | 1/2014 | Lee | H05K 7/00 361/679.01 |
| 2016/0170245 | A1* | 6/2016 | Zhang | G02F 1/1303 445/25 |
| 2016/0174423 | A1* | 6/2016 | Oh | G02F 1/13 445/25 |
| 2016/0363789 | A1* | 12/2016 | Jing | B30B 1/38 |
| 2018/0029200 | A1* | 2/2018 | Zhang | B25B 11/005 |

FOREIGN PATENT DOCUMENTS

| | | |
|---|---|---|
| KR | 10-2012-0013265 A | 2/2012 |
| KR | 10-2012-0051630 A | 5/2012 |
| KR | 10-1214537 B1 | 12/2012 |
| KR | 10-2014-0010919 A | 1/2014 |

* cited by examiner

CURVED DISPLAY MANUFACTURING DEVICE AND CURVED DISPLAY MANUFACTURING METHOD

CROSS REFERENCE TO PRIOR APPLICATIONS

This application is a National Stage Application of PCT International Patent Application No. PCT/KR2014/010724 filed on Nov. 10, 2014, under 35 U.S.C. § 371, which claims priority to Korean Patent Application No. 10-2014-0116329 filed on Sep. 2, 2014, which are all hereby incorporated by reference in their entirety.

TECHNICAL FIELD

The present invention relates to a curved display manufacturing apparatus and a curved display manufacturing method for manufacturing a curved display, using a prefabricated flat display panel.

BACKGROUND ART

Recently, in accordance with increased utility of displays and advance of technologies relevant to displays, a curved display, which does not have a flat shape, has been developed.

Such a curved display may be manufactured using, for example, a manufacturing apparatus disclosed in Korean Unexamined Patent Publication No. 10-2014-0010919 (issued on Jan. 27, 2014).

The above-mentioned conventional display device manufacturing apparatus includes a first jig formed with a seat surface to be engaged with one surface of a cover window having a flat portion with opposite curved ends, a second jig disposed spaced apart from the first jig by a certain distance, a clamping member disposed to be spaced apart from at least one of the first and second jigs, to support a panel member, and a driver connected to at least one of the first and second jigs connected to at least one of the first and second jigs, to move at least one of the first and second jigs.

In the conventional display device manufacturing apparatus having such a configuration, it may be possible to manufacture a curved display by inserting the cover window and panel member between the first jig and the second jig, and bonding the cover window and panel member to each other.

In the conventional display device manufacturing apparatus, however, the panel member, which has a flat plate shape, is bent during bonding thereof because the bonding is achieved by pressing force of the first and second jigs and, as such, a bonding portion of the panel member may be non-uniformly bonded. Furthermore, the panel member is bent under the condition that opposite ends thereof are clamped and, as such, pressing force applied to the panel member may be non-uniform. As a result, the panel member may be damaged.

DISCLOSURE

Technical Problem

Therefore, the present invention has been made in view of the above problems, and it is an object of the present invention to provide a curved display manufacturing apparatus and a curved display manufacturing method, which are capable of minimizing failure of bonding occurring in manufacture of a curved display, and preventing damage to a display panel.

Technical Solution

In accordance with an aspect of the present invention, the above and other objects can be accomplished by the provision of a curved display manufacturing apparatus for manufacturing a curved display by bending a display panel into a curved shape, including a curved surface suction mold comprising a panel seat surface having a curved shape corresponding to a curved shape of the curved display to be formed, and air sucking holes formed through the panel seat surface, to fix the display panel while bending the display panel by suction of air, an air sucking unit for sucking air through the air sucking holes, a main frame for supporting the curved surface suction mold, to space the curved surface suction mold from a bottom of the main frame, and a pressing roller unit for pressing a curvature maintaining member to maintain the display panel in a bent state while sliding along a curved surface of the display panel under a condition that the curvature maintaining member overlaps with the display panel, for pressed attachment of the curvature maintaining member to the display panel.

The curved display manufacturing apparatus may further include a first spacer for spacing, from the display panel, an other end portion of the curvature maintaining member, at which pressing of the pressing roller is finished.

The curved display manufacturing apparatus may further include a first spacer driving mechanism for moving the first spacer when the pressing roller moves from one end portion of the curvature maintaining member to the other end portion of the curvature maintaining member, for pressed attachment of the curvature maintaining member, to gradually move the first spacer toward the display panel.

The curved display manufacturing apparatus may further include a second spacer for spacing an intermediate portion of the curvature maintaining member from the display panel.

The curved display manufacturing apparatus may further include a second spacer driving mechanism for moving the second spacer when the pressing roller moves from one end portion of the curvature maintaining member to the intermediate portion of the curvature maintaining member, for pressed attachment of the curvature maintaining member, to gradually move the second spacer toward the display panel.

The curved display manufacturing apparatus may further include a sliding mechanism for horizontally moving the pressing roller unit along the main frame.

The sliding mechanism may include a moving block coupled to the pressing roller unit, and formed with a through hole having threads, a threaded rod formed, at an outer surface thereof, with threads to be threaded into the threads of the through hole, the thread rod extending in a movement direction of the pressing roller unit, and a drive motor for rotating the threaded rod.

The pressing roller unit may include a roller pressing mechanism for pressing the pressing roller in a close contact state, and a roller pivoting mechanism for pivoting the roller pressing mechanism, to cause the pressing roller to perform a circular arc movement such that the pressing roller is directed in a tangential direction perpendicular to the panel seat surface.

The roller pivoting mechanism may include a servomotor.

The pressing roller unit may further include a support roller for supporting an intermediate portion of the pressing roller, to prevent bending of the pressing roller.

The curved surface suction mold may be replaceably mounted to the main frame.

The curved surface suction mold may further include a position setting portion provided at the panel seat surface, to set a seat position of the curvature maintaining member.

In accordance with another aspect of the present invention, there is provided a curved display manufacturing method for manufacturing a curved display by bending, into a curved shape, a pre-fabricated flat display panel including first and second substrates facing each other, a liquid crystal layer interposed between the first substrate and the second substrate, and a polarization film, including shaving the first and second substrates to a predetermined thickness, seating the shaved display panel on a curved surface suction mold having a shape corresponding to a curved shape of a curved surface to be formed, and bending the display panel into the curved shape by suction of air, attaching, to the display panel, the curvature maintaining member to maintain a shape of the display panel bent into the curved shape by pressing the curvature maintaining member by a pressing roller, and separating the display panel carrying the curvature maintaining member from the curved surface suction mold.

The attaching the curvature maintaining member to the display panel by pressing the curvature maintaining member by the pressing roller may include moving the pressing roller from one end of the curvature maintaining member to the other end of the curvature maintaining member under a condition that one end of the curvature maintaining member is in close contact with the display panel, and the other end of the curvature maintaining member is spaced apart from the display panel, to attach the curvature maintaining member to the display panel.

The attaching the curvature maintaining member to the display panel by pressing the curvature maintaining member by the pressing roller may include moving the pressing roller from one end of the curvature maintaining member to the other end of the curvature maintaining member while pressing the pressing roller in a tangential direction of the curved surface, to attach the curvature maintaining member.

The attaching the curvature maintaining member to the display panel by pressing the curvature maintaining member by the pressing roller may include supporting an other end of the curvature maintaining member by a first spacer such that the other end of the curvature maintaining member is spaced apart from the display panel, and moving the first spacer when the pressing roller moves from one end portion of the curvature maintaining member to the other end portion of the curvature maintaining member, to gradually move the first spacer toward the display panel.

The curved display manufacturing method may further include attaching, to the display panel or the curvature maintaining member, a bonding member to bond the display panel and the curvature maintaining member, before the bending the display panel into the curved shape.

The curved display manufacturing method may further include attaching an insulating member to one of a portion of the curvature maintaining member contacting a drive circuit substrate coupled to the display panel to drive the display panel and a portion of the drive circuit substrate contacting the curvature maintaining member, for insulation of the curvature maintaining member and the drive circuit substrate from each other.

The curved display manufacturing method may further include separating the polarization film from the first substrate or the second substrate, to which the polarization film has been attached, before the shaving the first and second substrates to the predetermined thickness.

The curved display manufacturing method may further include attaching the polarization film to the first substrate or the second substrate, after the shaving the first and second substrates to the predetermined thickness or after the separating the display panel from the curved surface suction mold.

Advantageous Effects

In accordance with the present invention, the display panel is bent into a curved shape through suction of air and, as such, it may be possible to prevent the display panel from being damaged during bending thereof because force is uniformly applied to the entire portion of the display panel.

Meanwhile, the pressing roller attaches the curvature maintaining member to the display panel while moving from one end of the display panel to the other end of the display panel under the condition that the display panel and curvature maintaining member are spaced apart from each other by the first spacer or second spacer and, as such, it may be possible to prevent failure of bonding between the curvature maintaining member and the display panel.

In addition, the pressing roller presses the curvature maintaining member while being directed in a tangential direction, to attach the curvature maintaining member. Accordingly, it may be possible to prevent the display panel from being damaged due to non-uniform pressing force.

In addition, the pressing roller is slidably moved in a lateral direction by the sliding mechanism while being pivoted by the roller pivoting mechanism and, as such, it is unnecessary to place the pivotal axis of the pressing roller at an apex of a curved surface. Accordingly, the size of the apparatus may be reduced.

DESCRIPTION OF DRAWINGS

The above and other objects, features and other advantages of the present invention will be more clearly understood from the following detailed description taken in conjunction with the accompanying drawings, in which.

[Description of Reference Numerals]

| | |
|---|---|
| 100: curved display manufacturing apparatus | 110: curved surface suction mold |
| 111: panel seat surface | 113: air sucking hole |
| 115: air sucking means | 120: main frame |
| 130: pressing roller unit | 131: pressing roller |
| 133: roller support member | 133a: support roller |
| 135: unit case | 137: unit frame |
| 140: roller pressing mechanism | 141: guide rod |
| 150: sliding mechanism | 151: threaded rod |
| 153: moving block | 155: drive motor |
| 157: rail | 159: rail support block |
| 160: roller pivoting mechanism | 161: horizontal shaft |
| 170: first spacer | 171: first spacer driving mechanism |
| 180: second spacer | 181: second spacer driving mechanism |
| 190: control panel | 200: display panel |
| 210: first substrate | 220: second substrate |
| 230: liquid crystal layer | 240: polarization film |
| 250: drive circuit substrate | 300: curvature maintaining member |
| 400: bonding member | 500: insulating member |

MODE FOR INVENTION

Hereinafter, preferred embodiments of the present invention will be described in detail with reference to the accompanying drawings.

Figure 6:
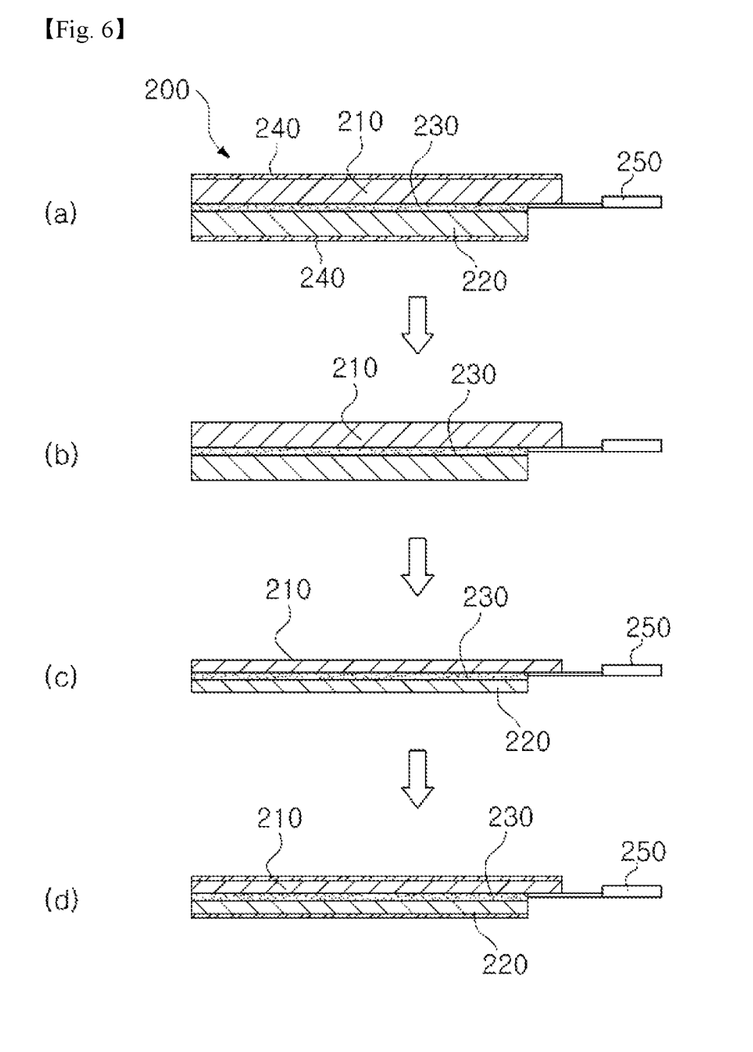
FIG. 6 is a view roughly illustrating a method for manufacturing a curved display panel to be used in a curved display manufacturing method according to an embodiment of the present invention.

First, the curved display manufacturing apparatus of the present invention, namely, a curved display manufacturing apparatus 100, is adapted to manufacture a curved display by bending a flat display panel 200, which is pre-fabricated as a ready-made article. The display panel 200, which is to be loaded in the curved display manufacturing apparatus 100, may be shaved to a predetermined thickness so as to be easily bent (FIG. 6).

As illustrated in FIGS. 1 to 5, in accordance with an embodiment of the present invention, the curved display manufacturing apparatus 100 may include a curved surface suction mold 110.

The curved surface suction mold 110 may bend the display panel 200, which has a flat plate shape, into a curved shape.

Meanwhile, the curved suction mold 110 may have a box or block shape. The curved suction mold 110 has an upper surface having a curved shape corresponding to a curved shape of the curved display. Accordingly, when the display panel 200 is seated on the upper surface of the curved suction mold 110, the display panel 200 is bent into a curved shape.

In this case, the upper surface of the curved suction mold 110, on which the display panel 200 is to be seated, may become a panel seat surface 111.

A plurality of air sucking holes 113 may be formed through the panel seat surface 111. The air sucking holes 113 may be connected to an air sucking means 115, for example, an air sucking device such as a vacuum pump. Accordingly, as air is sucked through the air sucking holes 113, it may be possible to fix the display panel 200 seated on the panel seat surface 111 to the curved surface suction mold 110, and to bend the display panel 200 into a shape corresponding to the curved shape of the panel seat surface 111.

Although the panel seat surface 111 is formed to have a downwardly concave shape in the illustrated embodiment, the panel seat surface 111 may have various curved shapes such as an upwardly convex shape, a wave shape, and a partially curved shape.

In addition, the panel seat surface 111 may have a shape curved in a long horizontal direction of the display panel 200 about a center of the display panel 200 or in a short vertical direction of the display panel 200 about the center of the display panel 200.

When the display panel 200 is fixed in a bent state, using the curved surface suction mold 110, as described above, it may be possible to bend the display panel 200 by uniformly applying force to the entire portion of the display panel 200 and, as such, damage to the display panel 200 may be minimized.

Since the display panel 200 is fixed to the curved surface suction mold 110 in accordance with suction of air, it may also be possible to eliminate installation of jigs to fix the display panel 200. Accordingly, it may be possible to rapidly fix the display panel 200, and to easily fix the display panel 200 to the curved surface suction mold 110.

The curved surface suction mold 110 may include position setting portions 117.

The position setting portions 117 may set a seat position of a curvature maintaining member 300 on the panel seat surface 111 of the curved surface suction mold 110.

Meanwhile, the position setting portions 117 may be provided in the form of protrusions or grooves at one side portion of the panel seat surface 111, in more detail, at a portion of the panel seat surface 111 where the curvature maintaining member 300 begins to be pressed. In this case, protrusions or grooves may also be formed at an end portion of the curvature maintaining member 300 in accordance with the shape of the position setting portions 117 and, as such, may be engaged with respective position setting portions 117.

Figure 1:
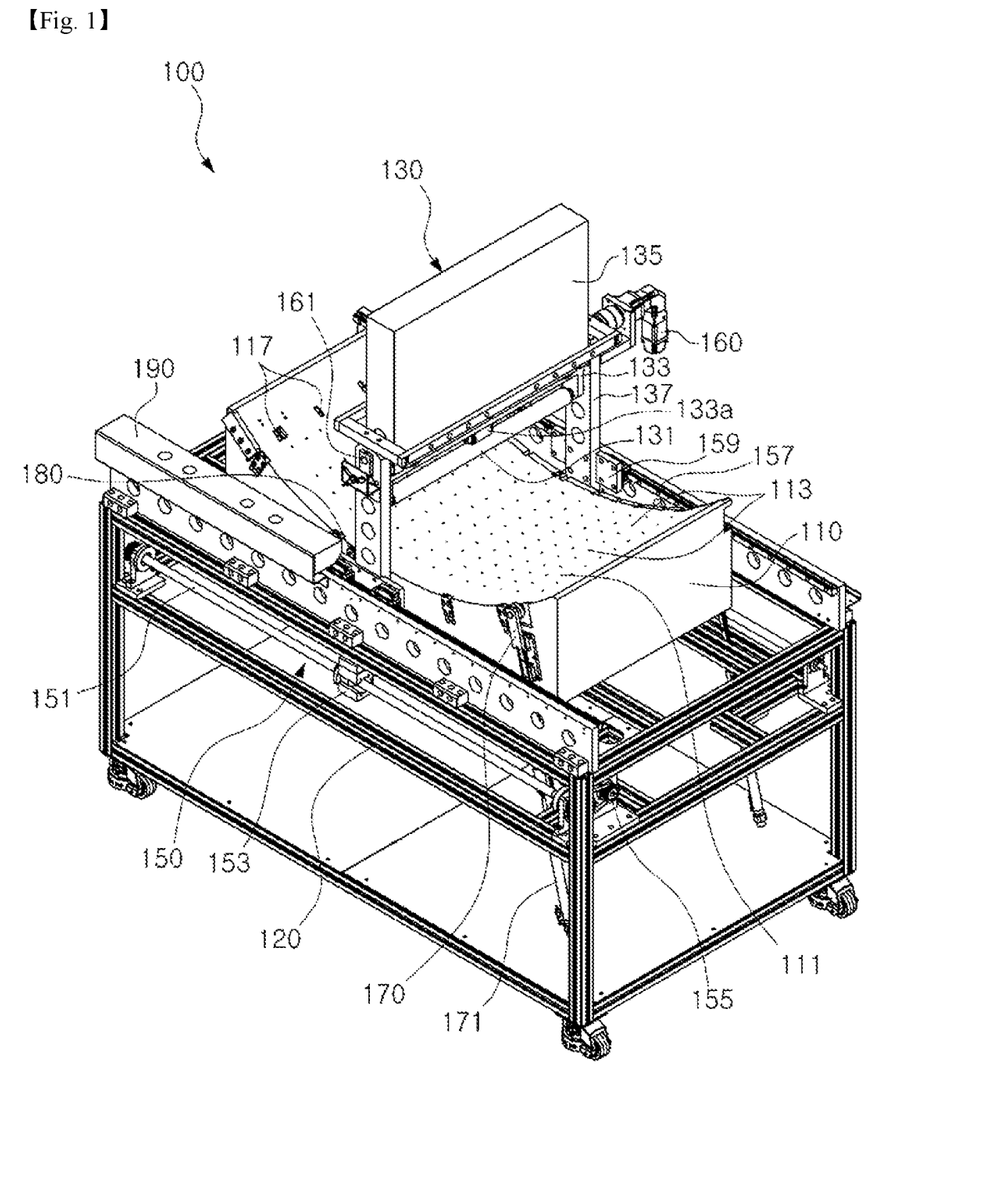
FIG. 1 is a perspective view illustrating a curved display manufacturing apparatus according to an embodiment of the present invention.
Figure 2:
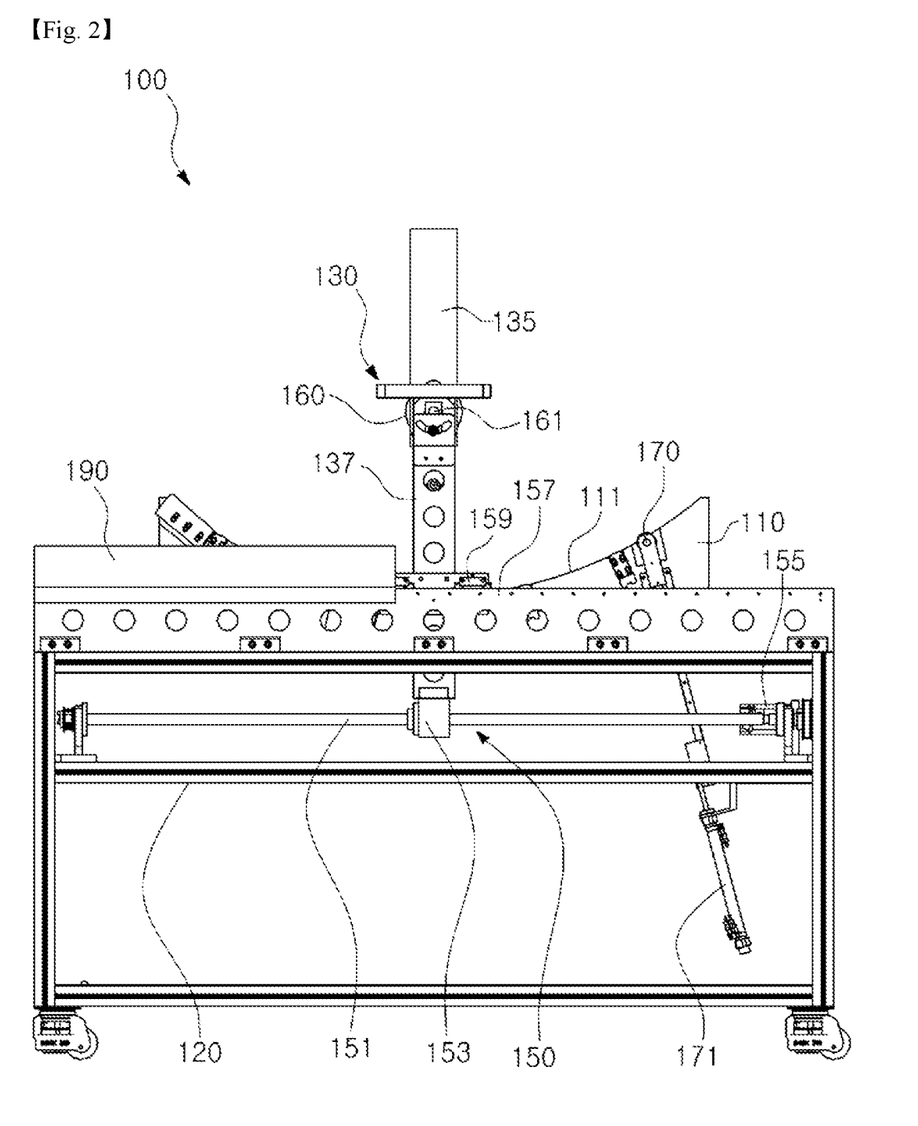
FIG. 2 is a front view illustrating the curved display manufacturing apparatus according to the embodiment of the present invention.
Figure 3:
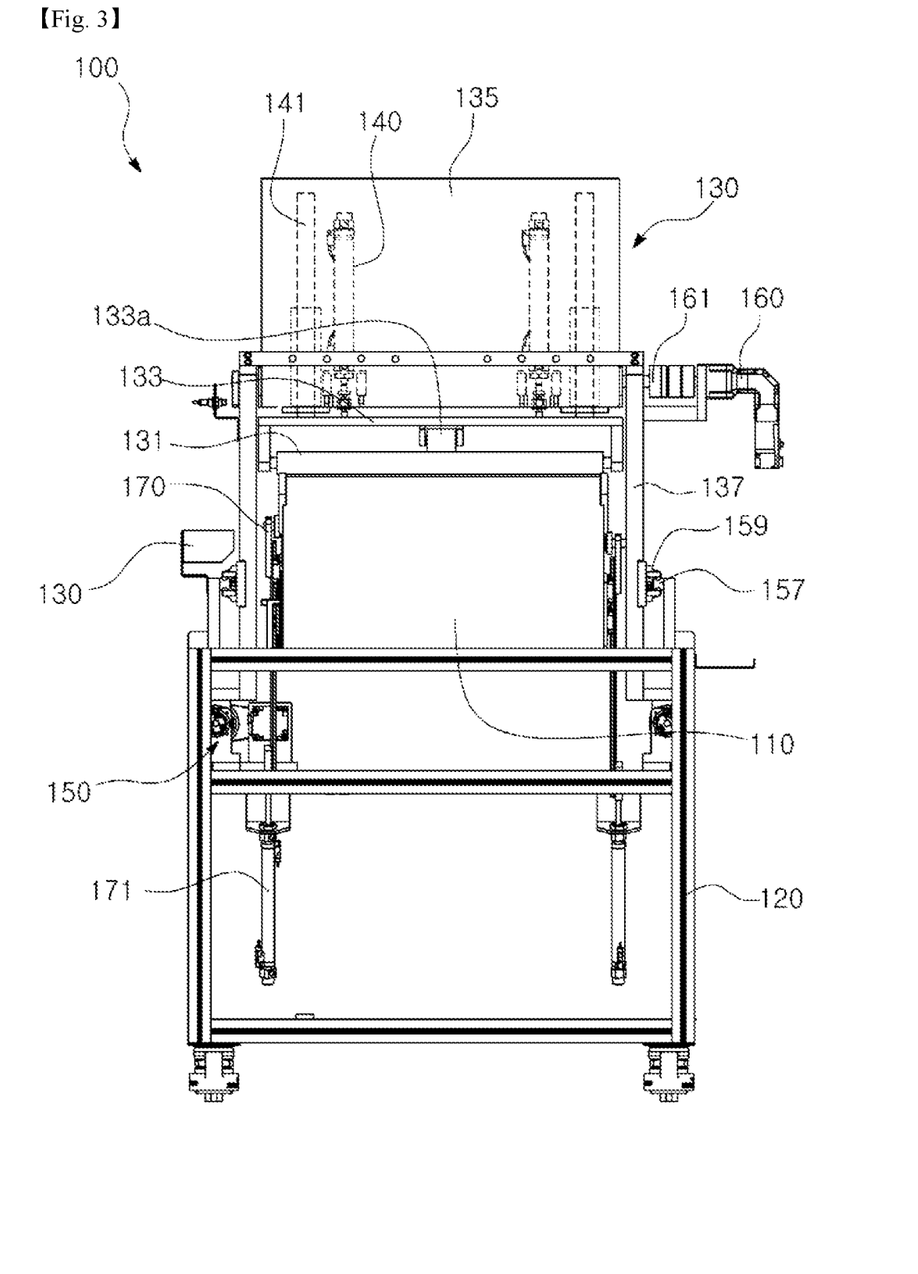
FIG. 3 is a side view illustrating the curved display manufacturing apparatus according to the embodiment of the present invention.

As illustrated in FIGS. 1 to 3, the curved display manufacturing apparatus 100 according to the illustrated embodiment of the present invention may include a main frame 120.

The main frame 120 may support the curved surface suction mold 110 in a state of being upwardly spaced from a bottom of the main frame 120 in order to allow the operator to easily perform a task.

Meanwhile, the main frame 120 may be configured by connecting a plurality of bars, to form a box shape. Installed at desired portions of the main frame 120 may be configurations to be described later, the air sucking means 115 to suck air through the air sucking holes of the curved surface suction mold 110, an air supply means to actuate a cylinder, etc. to be described later, and a control panel 190 to control the curved display manufacturing apparatus 100.

In addition, the curved surface suction mold 110 may be replaceably installed at the main frame 120. For example, the installed curved surface suction mold 110 may be replaced by another one in accordance with the size of the display panel 200 or the shape of the curved surface to be formed.

In this case, the curved surface suction mold 110 may be coupled to the main frame 120 by coupling means to couple two separated members, for example, bolts.

Figure 4:
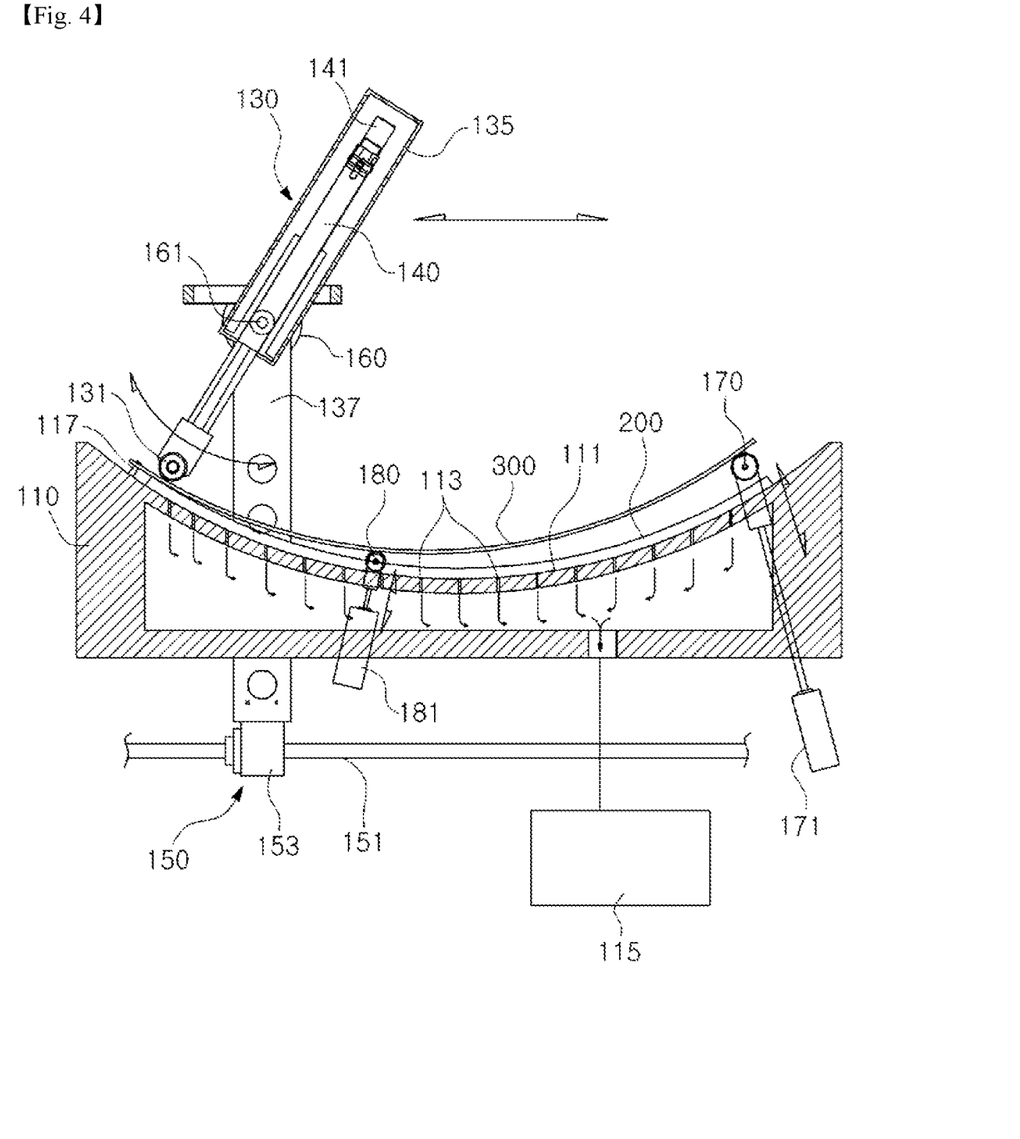
FIG. 4 is a view roughly illustrating an operating state of the curved display manufacturing apparatus according to the embodiment of the present invention before attachment of a curvature maintaining member.
Figure 5:
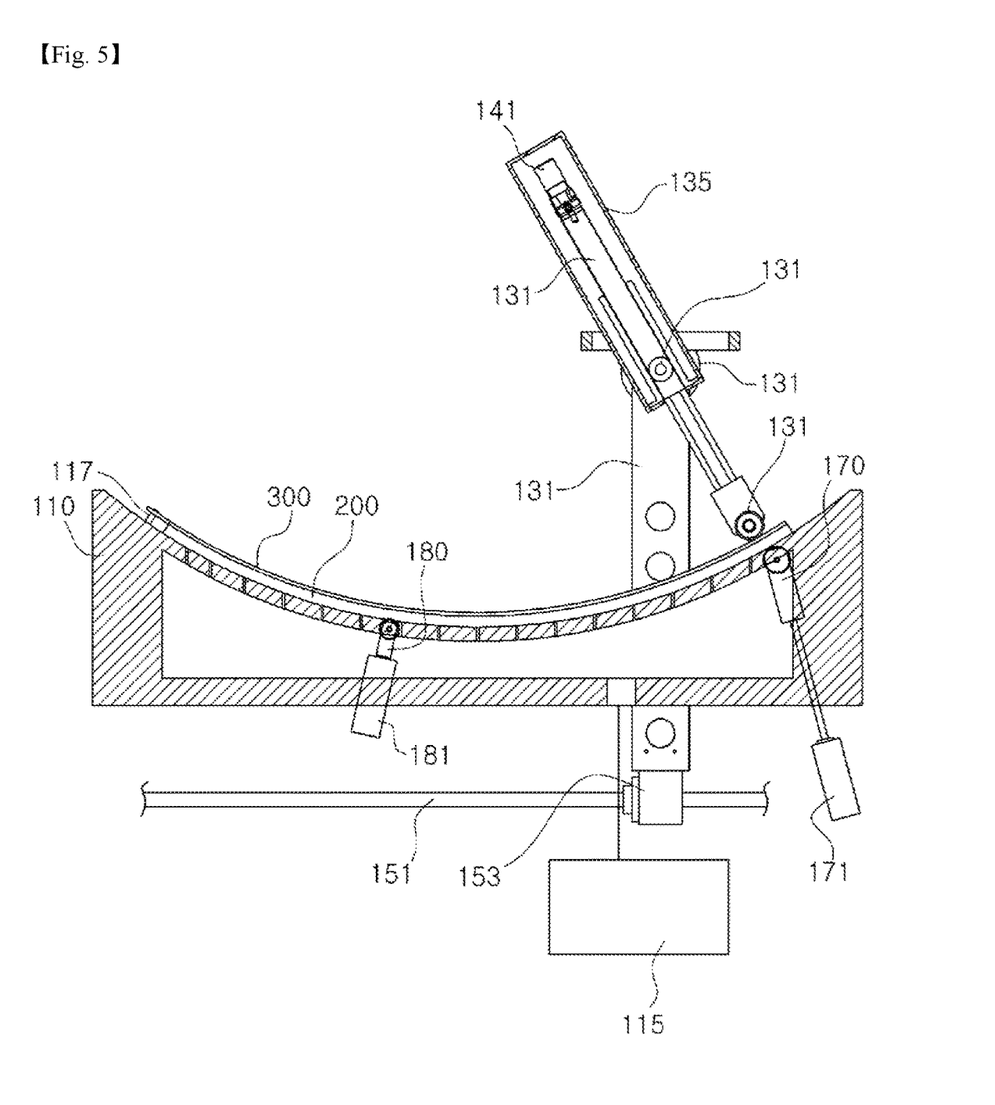
FIG. 5 is a view roughly illustrating an operating state of the curved display manufacturing apparatus according to the embodiment of the present invention after attachment of the curvature maintaining member.

As illustrated in FIGS. 3 to 5, the curved display manufacturing apparatus 100 according to the illustrated embodiment of the present invention may include a pressing roller unit 130.

Using the pressing roller unit 130, it may be possible to attach, to an outer surface of the display panel 200, the curvature maintaining member 300 to maintain the display panel 200 in a curved state.

In this case, the curvature maintaining member 300 may be made of a metal plate. The curvature maintaining member 300 may have a centrally open shape and, as such, may maintain a desired curvature of the display panel 200 simply by supporting a peripheral portion of the display panel 200. The curvature maintaining member 300 may also have a flat plate shape or a curved plate shape having a curvature, along which the display panel will be bent.

A bonding member 400 may be provided at the peripheral panel 200, to which the curvature maintaining member 300 will be attached, or a peripheral portion of the curvature maintaining member 300, which will be attached to the display panel 200, in order to bond the curvature maintaining member 30 to the display panel 200. In this case, the bonding member 400 may be a double-sided adhesive tape or an adhesive.

Meanwhile, the pressing roller unit 130 may include a pressing roller 131.

The pressing roller 131 presses an outer surface of the curvature maintaining member 300 while moving along the curved surface of the display panel 200 under the condition that the curvature maintaining member 300 overlaps with the outer surface of the display panel 200 sucked onto the curved surface suction mold 110, thereby bonding the curvature maintaining member 30 to the display panel 200.

The pressing roller 131 may have an elongated cylindrical shape in order to completely press the display panel 200 in the horizontal direction or in the vertical direction. The pressing roller 131 may be made of a material having elasticity, for example, silicon or urethane, in order to prevent the display panel 200 from being damaged when the pressing roller 131 presses the curvature maintaining member 300.

Meanwhile, the pressing roller 131 may include a roller support member 133. The roller support member 133 may support opposite ends of the pressing roller 131 while allowing the pressing roller 131 to rotate. A support roller 133a may be mounted at an intermediate portion of the roller support member 133, to support a central portion of the elongated pressing roller 131, and, as such, it may be possible to prevent bending of the pressing roller 131.

In addition, the pressing roller unit 130 may include a roller pressing mechanism 140.

The roller pressing mechanism 140 may vertically move the pressing roller 131 such that the pressing roller 131 presses an upper surface of the curvature maintaining member 300 in order to bring the curvature maintaining member 300 into close contact with the display panel 200 or releases pressing.

Meanwhile, the roller pressing mechanism 140 may be implemented using a pneumatic or hydraulic cylinder. For vertical movement of the pressing roller 131, any of well known technologies may be used. For example, a configuration capable of vertically moving the pressing roller 131 through engagement of gears may be used.

The roller pressing mechanism 140 may include guide rods 141.

When the pressing roller 131 is moved by the roller pressing mechanism 140, the guide rods 141 may guide movement of the pressing roller 131. Meanwhile, each guide rod 141 may be received in a unit case 135 while being connected to the roller support member 133 such that the guide rod 141 is vertically slidable along the unit case 135 and, as such, may guide movement of the pressing roller 131.

The pressing roller unit 130 may include unit frames 137.

The unit frames 137 have a bar shape to support opposite sides of the pressing roller unit 130, respectively. Accordingly, the pressing roller unit 130 is fixed to the main frame 120 by the unit frames 137.

Meanwhile, the unit frames 137 are coupled to a sliding mechanism 150, which will be described later. Accordingly, the unit frames 137 slidably move the pressing roller unit 130 along the main frame 120. Movement of the pressing roller unit 130 will be described in detail in conjunction with description of the sliding mechanism 150, which will be given later.

In addition, the unit frames 137 may include the unit case 135.

The unit case 135 may connect the unit frames 137, which are disposed at opposite ends of the unit case 135. The unit case 135 may have a box shape, and may be coupled to the unit frames 137, to be rotatable about a horizontal shaft 161.

The roller pressing mechanism 140 is coupled to the unit case 135 within the unit case 135. The roller pressing mechanism 140 extends downward through a bottom of the unit case 135 and, as such, the pressing roller 131 performs circular arc movement about the horizontal shaft 161 during rotation of the unit case 135 with respect to the unit frames 137.

In addition, the pressing roller unit 130 may include a roller rotating mechanism 160.

The roller pivoting mechanism 160 pivots the unit case 135 about the horizontal shaft 161 with respect to the unit frame 137 such that the pressing roller 131 is directed in a tangential direction perpendicular to the curved outer surface of the curvature maintaining member 300 when the pressing roller 131 bonds the curvature maintaining member 300 to the display panel 200 while moving along the outer surface of the curvature maintaining member 300 and, as such, the roller pivoting mechanism 160 may cause the pressing roller 131 to perform circular arc movement with respect to the unit frame 137.

In this case, the roller pivoting mechanism 160 may be implemented using an electronically controlled servomotor.

When the roller pivoting mechanism 160 is configured using a gear system, impact may be generated due to engagement of gears during initial operation of the roller pivoting mechanism 160 and, as such, the display panel 200 may be damaged. For this reason, the roller pivoting mechanism 160 is preferably configured by a servomotor, which is precisely controllable in an electronic manner, in order to reduce impact caused by engagement of gears.

The pressing roller unit 130 configured as described above is installed to actuate the roller pressing mechanism 140 at one end of the display panel 200 such that the pressing roller 131 presses a spacer and the display panel 200, and is moved toward the other end of the display panel 200 by the sliding mechanism 150, which will be described later, while maintaining the pressing state thereof.

Meanwhile, the pressing roller unit 130 may be mounted to the unit frames 137 such that the pressing roller unit 130 bonds the curvature maintaining member 300 to the display panel 200 while pivoting about a center of the panel seat surface 111 defined by the curved surface of the curved surface suction mold 110, without sliding along the main frame 120 by the sliding mechanism 150, which will be described later.

As illustrated in FIGS. 1 to 5, the curved display manufacturing apparatus according to the illustrated embodiment of the present invention may include the sliding mechanism 150.

The sliding mechanism 150 slidably moves the pressing roller unit 130 along the main frame 120 in order to bond the curvature maintaining member 300 to the display panel 200 while moving along the curved surface of the curvature maintaining member 300.

Meanwhile, the sliding mechanism 150 may include threaded rods 151, a drive motor 155, and moving blocks 153.

Each threaded rod 151 has a rod shape, and is formed with threads at an outer surface thereof. The threaded rods 151 may be mounted to the main frame 120, to extend horizontally in a pivoting direction of the pressing roller unit 130. The threaded rods 151 may be mounted to the main frame 120, to be rotatable by the drive motor 155.

Meanwhile, each moving block 153 may be centrally formed with a through hole, through which the corresponding threaded rod 151 extends. Threads to be threaded into the threads of the threaded rod 151 may be formed at an inner surface of the through hole.

The moving blocks 153 may be coupled to the lower ends of the unit frames 137 supporting the pressing roller unit 130, respectively. Alternatively, the moving blocks 137 may be formed to be integrated with the unit frames 137, respectively. That is, a through hole, through which one threaded rod 151 will extend, is formed at the lower end of each unit frame 137. Threads to be threaded into the threads of the threaded rod 151 are formed at an inner surface of the through hole.

The sliding mechanism 150 configured as described above may slidably move the pressing roller unit 130 coupled to the moving blocks 153 toward one end or the other end of the display panel 200 along the main frame 120 in accordance with a rotation direction of the threaded rods 151 because the threaded rods 151 are threaded into respective moving blocks 153 and, as such, the moving blocks 153 slide along respective threaded rods 151 when the threaded rods 151 rotate by the drive motor 155.

Meanwhile, the sliding mechanism 150 may include rails 157.

When the pressing roller unit 130 slides along the main frame 120, the rails 157 may guide movement of the pressing roller unit 130.

The rails 157 may guide movement of the pressing roller unit 130 in such a manner that the rails 157 guide the unit frames 137 of the pressing roller unit 130. The rails 157 may be mounted to the main frame 120, to extend in a movement direction of the pressing roller unit 130.

In this case, rail support blocks 159 may be coupled to respective unit frames 137, to be supported by respective rails 157. The rail support blocks 159 may guide movement of the unit frames 137 while moving along respective rails 157.

As illustrated in FIGS. 1, 4, and 5, the curved display manufacturing apparatus 100 according to the illustrated embodiment of the present invention may include first spacers 170.

The first spacers 170 may support the curvature maintaining member 300, to maintain the curvature maintaining member 300 in a state of being spaced apart from the display panel 200 at the other end thereof during bonding thereof to the display panel 200, which is begun by the pressing roller 131 at one end of the curvature maintaining member, and is finished at the other end of the curvature maintaining member 300.

Meanwhile, the first spacers 170 may be provided at opposite sides of a portion of the curved surface suction mold 110 where the other end of the display panel 200, at which pressing of the pressing roller 131 is finished. Each first spacer 170 may be mounted to the curved surface suction mold 110, to be vertically movable. Each first spacer 170 may have a roller shape.

Each first spacer 170 may include a first spacer driving mechanism 171. The first spacer driving mechanism 171 may move the first spacer 170 such that the first spacer 170 projects upwards above the curved surface suction mold 110, in more detail, the panel seat surface 111, or retracts downwards below the panel seat surface 111.

In this case, the first spacer driving mechanism 171 may be implemented using a pneumatic or hydraulic cylinder. Alternatively, the first spacer driving mechanism 171 may be implemented using a mechanical device having a gear engagement structure.

The first spacers 170 configured as described above support the other end of the curvature maintaining member 300 in a state of projecting above the panel seat surface 111 such that the other end of the curvature maintaining member 300 disposed at the other end of the display panel 200 is maintained in a state of being spaced apart from the display panel 200 before bonding of the curvature maintaining member 300 to the display panel 200 by the pressing roller 131.

The first spacer driving mechanism 171 actuates the corresponding first spacer 170 such that the first spacer 170 is gradually moved in a downward direction, to gradually reduce the spacing between the curvature maintaining member 300 and the display panel 200 as the pressing roller 131 begins to press one end of the curvature maintaining member 300 and moves toward the other end of the curvature maintaining member 300 while pressing the curvature maintaining member 300.

Although the first spacers 170 are configured to space the curvature maintaining member 300 by upwardly pushing the curvature maintaining member 300 from a position below the curved surface suction mold 110 in the illustrated embodiment, the first spacers 170 may be configured to space the curvature maintaining member 300 by upwardly lifting the curvature maintaining member 300 under the condition that the first spacers 170 are disposed above the curved surface suction mold 110.

As illustrated in FIGS. 4 and 5, the curved display manufacturing apparatus 100 according to the illustrated embodiment of the present invention may include second spacers 180.

The second spacers 180 may support an intermediate portion of the curvature maintaining member 300, the other end of which is supported by the first spacers 170.

Meanwhile, the second spacers 180 may have a roller shape, similarly to the first spacers 170. The second spacers 180 may be provided at opposite sides of an intermediate portion of the curved surface suction mold 110, and may be mounted to the curved surface suction mold 110, to be vertically movable.

Each second spacer 180 may include a second spacer driving mechanism 181. Accordingly, the second spacer 180 may move in an upward or downward direction by the second spacer driving mechanism 181.

In this case, the second spacer driving mechanism 181 may be implemented using a pneumatic or hydraulic cylinder. Alternatively, the second spacer driving mechanism 181 may be implemented using a mechanical device having a gear engagement structure.

Meanwhile, the second spacers 180 may have a lower projection height from the panel seat surface 111 than the first spacers 170 such that the intermediate portion of the curvature maintaining member 300, the other end of which is supported by the first spacers 170, may be smoothly bent by gravity.

The second spacers 180 configured as described above support the intermediate portion of the curvature maintaining member 300 in a state of projecting above the panel seat surface 111 such that the intermediate portion of the curvature maintaining member 300 disposed at an intermediate portion of the display panel 200 is maintained in a state of being spaced apart from the display panel 200 before bonding of the curvature maintaining member 300 to the display panel 200 by the pressing roller 131.

The second spacer driving mechanism 181 actuates the corresponding second spacer 180 such that the second spacer 180 is gradually moved in a downward direction, to gradually reduce the spacing between the curvature maintaining member 300 and the display panel 200 as the pressing roller 131 begins to press one end of the curvature maintaining member 300 and moves toward the other end of the curvature maintaining member 300 while pressing the curvature maintaining member 300.

Although the second spacers 180 are configured to space the curvature maintaining member 300 by upwardly pushing the curvature maintaining member 300 from a position below the curved surface suction mold 110 in the illustrated embodiment, the second spacers 180 may be configured to space the curvature maintaining member 300 by upwardly lifting the curvature maintaining member 300 under the condition that the second spacers 180 are disposed above the curved surface suction mold 110.

Hereinafter, functions and effects obtained by the constituent elements will be described in conjunction with a curved display manufacturing method.

First, as illustrated in FIG. 6(a), an existing pre-fabricated display panel having a flat shape is used as the display panel 200 to be used in a curved display manufacturing method according to an embodiment of the present invention. The existing pre-fabricated display panel 200, which has a flat shape, may include a first substrate 210, a second substrate 220, and a liquid crystal layer 230 interposed between the first substrate 210 and the second substrate 220.

When one of the first and second substrates 210 and 220 is a color filter substrate, the other of the first and second substrates 210 and 220 may be a thin film transistor substrate.

A polarization film 240 may be attached to one or both of outer surfaces of the first and second substrates 210 and 220. A drive circuit substrate 250 to drive the display panel 200 may be attached to a certain position on a peripheral portion of the display panel 200.

In addition, the display panel 200 may have a structure in which a backlight (not shown) is attached to one of the outer surfaces of the first and second substrates 210 and 220.

In accordance with the curved display manufacturing method according to the illustrated embodiment of the present invention, in the case in which the polarization film 240 is attached to the existing pre-fabricated flat display panel 200, the polarization film 240 is removed, as illustrated in FIG. 6(b). The removed polarization film 240 may be stored for re-use thereof under the condition that a release sheet is attached to the polarization film 240.

Meanwhile, as illustrated in FIG. 6(c), the first and second substrates 210 and 220 are shaved to a predetermined thickness and, as such, the display panel 200, from which the polarization film 240 has been removed, has a reduced thickness, to be easily bent.

In this case, the first and second substrates 210 and 220 may be shaved through mechanical polishing or chemical etching.

Thereafter, as illustrated in FIG. 6(d), the removed polarization film 240 is attached to the shaved display panel 200, in detail, the outer surface of the first substrate 210 or second substrate 220.

Alternatively, the polarization film 240 may be attached to the substrate of the first substrate 20 or second substrate 220 after unloading of the display panel 200 carrying the curvature maintaining member 300 from the curved display manufacturing apparatus 100 in a final procedure. The polarization film 240 may not be the removed polarization film 240, but may be a new polarization film.

As illustrated in FIG. 7(a), the display panel 200 carrying the polarization film 240 in the above-described manner is then seated on the panel seat surface 111 of the curved display manufacturing apparatus 100 according to the illustrated embodiment of the present invention.

In this case, seating of the display panel 200 on the curved display manufacturing apparatus 100 is achieved by aligning the display panel 200 with a panel seat position indicated on the panel seat surface 111 of the curved surface suction mold 110, and then operating the air sucking means 115 installed at the control panel.

When the air sucking means 115 operates, air is sucked through the air sucking holes 113 of the panel seat surface 111 and, as such, the display panel 200 is sucked onto the panel seat surface 111 while being bent to conform to the curved shape of the panel seat surface 111.

When the display panel 200 is bent in accordance with air suction, as described above, it may be possible to prevent the display panel 200 from being damaged due to non-uniform force applied to the display panel 200 because force is not partially applied to the display panel 200, but is applied to the entire portion of the display panel 200.

Meanwhile, as illustrated in FIG. 7(b), the bonding member 400 is attached to the peripheral portion of the display panel 200 in a state in which the display panel 200 is sucked onto the panel seat surface 111, in order to attach, to the display panel 200, the curvature maintaining member 300 for maintaining a desired curvature of the display panel 200.

In addition, an insulating member 500 is attached to a portion of the curvature maintaining member 300 contacting the drive circuit substrate 250 of the display panel 200 or a portion of the drive circuit substrate 250 contacting the curvature maintaining member 300, in order to insulate the curvature maintaining member 300 and drive circuit substrate 250 from each other.

Thereafter, as illustrated in FIG. 7(c), the curvature maintaining member 300 carrying the insulating member 500 is placed, to maintain a desired curvature of the display panel 200.

In this case, one end of the curvature maintaining member 300 is positioned to overlap with one end of the display panel 200. The other end of the curvature maintaining member 300 is supported by the first spacers 170, to be spaced apart from the display panel 200 by the first spacers 170. The intermediate portion of the curvature maintaining member 300 is also positioned to be spaced apart from the display panel 200 by the second spacers 180.

When a button to drive the pressing roller unit 130 of the control panel 190 is pressed in the above-described state, the pressing roller unit 130 is positioned at one end of the display panel 200 overlapping with the curvature maintaining member 300 by the sliding mechanism. In this state, the roller pivoting mechanism 160 operates to pivot the pressing roller 131 with respect to the unit frames 137, in order to enable the pressing roller 131 to press a curved surface of the curvature maintaining member 300 in a tangential direction perpendicular to the curved surface.

The pressing roller 131 is subsequently moved in a downward direction by the roller pressing mechanism 140, to press the upper surface of the curvature maintaining member 300. At the same time, the sliding mechanism 150 operates to move the pressing roller 131 along the curved surface in order to attach the curvature maintaining member 300 to the display panel 200.

In this case, the sliding mechanism 150 slidably moves the pressing roller unit 130 along the main frame 120 in such a manner that, when the drive motor 155 rotates the threaded rods 151, the moving blocks 153 threaded into respective threaded rods 151 are moved, thereby moving the unit frames 137 coupled to respective moving blocks 153.

Meanwhile, when the pressing roller 131 moves by the sliding mechanism 150, the roller pivoting mechanism 160 also operates to pivot the pressing roller 131 in order to enable the pressing roller 131 to press the curvature maintaining member 300 in a tangential direction perpendicular to the curved surface of the curvature maintaining member 300 in accordance with a position of the curved surface.

At the same time, the second spacer driving mechanisms 181 operate to gradually move the second spacers 180 in a downward direction in order to reduce the projection height of the second spacers 180 toward the intermediate portion of the curvature maintaining member 300. The first spacers 170 are also gradually moved in a downward direction by the first spacer driving mechanisms 171.

Since the curvature maintaining member 300 is bonded to the display panel 200 by the pressing roller 131 under the condition that the curvature maintaining member 300 is spaced apart from the display panel 200 by the first spacers 170 and second spacers 180, it may be possible to prevent non-uniform bonding of the curvature maintaining member 300 and penetration of air bubbles between bonding surfaces. In addition, it may be possible to prevent damage to the display panel 200 because the pressing roller 131 presses the curvature maintaining member 300 in a tangential direction of the curved surface.

In addition, since the pressing roller 131 is slidably moved by the sliding mechanism 150 while being pivoted by the roller pivoting mechanism 160, it is unnecessary to place the pivotal axis of the pressing roller 131 at an apex of a curved surface having a large curvature to press the curved surface in a tangential direction. Accordingly, the size of the apparatus may be reduced.

When bonding is completed as the pressing roller 131 moves to the other end of the curvature maintaining member 300 by the sliding mechanism 150 while pressing the curvature maintaining member 300, the pressing roller 131 is upwardly moved by the roller pressing mechanism 140, to release pressing. In this state, operation of the air sucking means 115 is stopped to release suction applied to the display panel 200, which has been bent to have a desired curvature in accordance with attachment of the curvature maintaining member 300 thereto.

Figure 7:
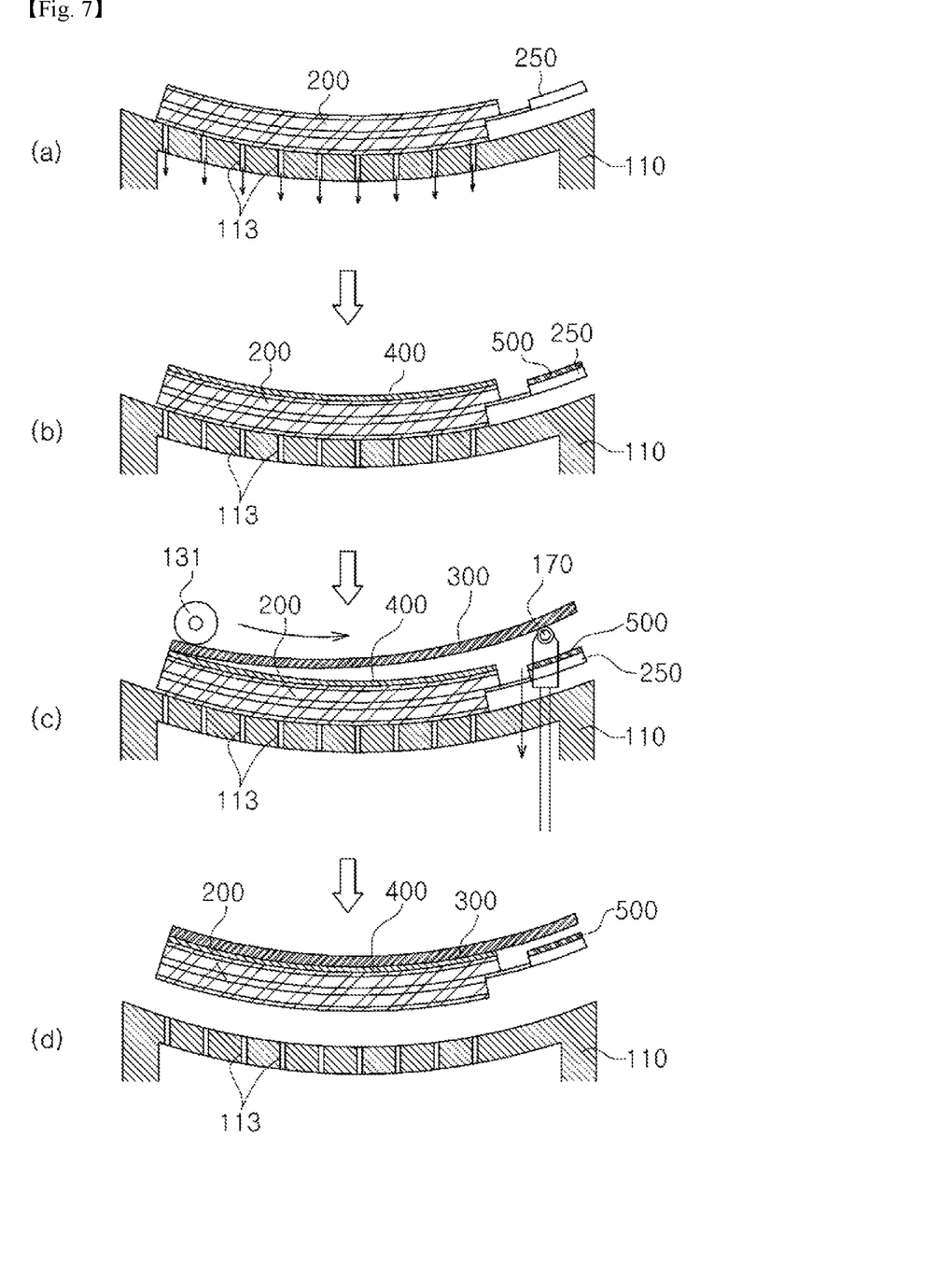
FIG. 7 is a view roughly illustrating the curved display manufacturing method according to an embodiment of the present invention.

As suction applied to the display panel 200 is released, as described above, the display panel 200, which has a desired curvature maintained by the curvature maintaining member 300, is separated from the panel seat surface 111, as illustrated in FIG. 7(*d*). Thus, manufacture of a curved display is completed.

Meanwhile, in order to attach the curvature maintaining member 30 to another display panel 200, the pressing roller unit 130 may return to an initial position by the sliding mechanism 150 before suction applied to the display panel 200 carrying the curvature maintaining member 300 is released by the air sucking means 115 or after the display panel 200 carrying the curvature maintaining member 300 is separated from the panel seat surface 111.

As apparent from the above description, in the curved display manufacturing apparatus according to the illustrated embodiment of the present invention, the display panel 200 is bent into a curved shape through suction of air and, as such, it may be possible to prevent the display panel 200 from being damaged during bending thereof into a curved shape because force is uniformly applied to the entire portion of the display panel 200.

Meanwhile, the curvature maintaining member 300 is attached to the display panel 200 under the condition that the display panel 200 and curvature maintaining member 300 are spaced apart from each other by the first spacers 170 and second spacers 180 and, as such, it may be possible to prevent non-uniform attachment and failure of bonding caused by penetration of air.

In addition, the pressing roller 131 presses the curvature maintaining member 300 in a tangential direction perpendicular to a curved surface by the sliding mechanism 150 and roller pivoting mechanism 160, to attach the curvature maintaining member 300. Accordingly, the curvature maintaining member 300 is pressed by uniform pressure and, as such, it may be possible to prevent the display panel 200 from being damaged during attachment of the curvature maintaining member 300.

In addition, the pressing roller 131 is slidably moved by the sliding mechanism 150 while being pivoted by the roller pivoting mechanism 160 and, as such, it is unnecessary to place the pivotal axis of the pressing roller 131 at an apex of a curved surface to press the curved surface in a tangential direction. Accordingly, the size of the apparatus may be reduced.

Meanwhile, when a curved display is manufactured using the curved display manufacturing method according to the present invention, it may be possible to minimize rate of poor products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to industrial fields associated with manufacture of displays such as a game machine, an advertisement board, a monitor, and a TV.

The invention claimed is:

1. A curved display manufacturing apparatus for manufacturing a curved display by bending a display panel into a curved shape, comprising:
   a curved surface suction mold comprising a panel seat surface having a curved shape corresponding to a curved shape of the curved display to be formed, and air sucking holes formed through the panel seat surface, to fix the display panel while bending the display panel by suction of air;
   an air sucking unit for sucking air through the air sucking holes;
   a main frame for supporting the curved surface suction mold, to space the curved surface suction mold from a bottom of the main frame; and a pressing roller unit for pressing a curvature maintaining member to maintain the display panel in a bent state while a pivot movement and a sliding movement along a curved surface of the display panel under a condition that the curvature maintaining member overlaps with the display panel, for pressed attachment of the curvature maintaining member to the display panel.

2. The curved display manufacturing apparatus according to claim 1, further comprising:
a first spacer for spacing, from the display panel, an other end portion of the curvature maintaining member, at which pressing of a pressing roller is finished.

3. The curved display manufacturing apparatus according to claim 2, further comprising:
a first spacer driving mechanism for moving the first spacer when the pressing roller moves from one end portion of the curvature maintaining member to the other end portion of the curvature maintaining member, for pressed attachment of the curvature maintaining member, to gradually move the first spacer toward the display panel.

4. The curved display manufacturing apparatus according to claim 1, further comprising:
a second spacer for spacing an intermediate portion of the curvature maintaining member from the display panel.

5. The curved display manufacturing apparatus according to claim 1, further comprising:
a second spacer driving mechanism for moving the second spacer when a pressing roller moves from one end portion of the curvature maintaining member to the intermediate portion of the curvature maintaining member, for pressed attachment of the curvature maintaining member, to gradually move the second spacer toward the display panel.

6. The curved display manufacturing apparatus according to claim 1, further comprising: a sliding mechanism for horizontally moving the pressing roller unit along the main frame.

7. The curved display manufacturing apparatus according to claim 1, wherein the sliding mechanism comprises:
a moving block coupled to the pressing roller unit, and formed with a through hole having threads;
a threaded rod formed, at an outer surface thereof, with threads to be threaded into the threads of the through hole, the thread rod extending in a movement direction of the pressing roller unit; and
a drive motor for rotating the threaded rod.

8. The curved display manufacturing apparatus according to claim 1, wherein the pressing roller unit comprises:
a roller pressing mechanism for pressing a pressing roller in a close contact state; and
a roller pivoting mechanism for pivoting the roller pressing mechanism, to cause the pressing roller to perform a circular arc movement such that the pressing roller is directed in a tangential direction perpendicular to the panel seat surface.

9. The curved display manufacturing apparatus according to claim 8, wherein the roller pivoting mechanism comprises a servomotor.

10. The curved display manufacturing apparatus according to claim 1, wherein the pressing roller unit further comprises a support roller for supporting an intermediate portion of the pressing roller, to prevent bending of the pressing roller.

11. The curved display manufacturing apparatus according to claim 1, wherein the curved surface suction mold is replaceably mounted to the main frame.

12. The curved display manufacturing apparatus according to claim 1, wherein the curved surface suction mold further comprises a position setting portion provided at the panel seat surface, to set a seat position of the curvature maintaining member.

* * * * *